(12) United States Patent
Zhang et al.

(10) Patent No.: US 7,443,865 B1
(45) Date of Patent: *Oct. 28, 2008

(54) MULTIPLE NETWORK CONNECTIONS FROM A SINGLE PPP LINK WITH NETWORK ADDRESS TRANSLATION

(75) Inventors: Shujin Zhang, San Mateo, CA (US); Jane Jiaying Jin, San Jose, CA (US); Jie Chu, Los Altos, CA (US); Maria Alice Dos Santos, Redwood City, CA (US); Shuxian Lou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1100 days.

This patent is subject to a terminal disclaimer.

(21) Appl. No.: 10/117,801

(22) Filed: Apr. 4, 2002

(51) Int. Cl.
*H04L 12/66* (2006.01)

(52) U.S. Cl. .................... 370/401; 709/227

(58) Field of Classification Search ............ 370/401, 370/402, 352, 354; 709/227, 217, 218
See application file for complete search history.

(56) References Cited

U.S. PATENT DOCUMENTS

| | | | |
|---|---|---|---|
| 4,922,486 A | 5/1990 | Lidinsky et al. | 370/60 |
| 5,136,580 A | 8/1992 | Videlock et al. | 370/60 |
| 5,241,594 A | 8/1993 | Kung | 380/4 |
| 5,274,631 A | 12/1993 | Bhardwaj | 370/60 |
| 5,280,480 A | 1/1994 | Pitt et al. | 370/85.13 |
| 5,423,002 A | 6/1995 | Hart | 395/200 |
| 5,430,715 A | 7/1995 | Corbalis et al. | 370/54 |
| 5,555,244 A | 9/1996 | Gupta et al. | 370/60.1 |
| 5,570,361 A | 10/1996 | Norizuki et al. | 370/60.1 |
| 5,583,862 A | 12/1996 | Callon | 370/397 |
| 5,592,470 A | 1/1997 | Rudrapatna et al. | 370/320 |
| 5,594,732 A | 1/1997 | Bell et al. | 370/401 |
| 5,617,417 A | 4/1997 | Sathe et al. | 370/394 |
| 5,655,077 A | 8/1997 | Jones et al. | 395/187.01 |
| 5,659,542 A | 8/1997 | Bell et al. | 370/496 |
| 5,671,354 A | 9/1997 | Ito et al. | 395/187.01 |
| 5,673,265 A | 9/1997 | Gupta et al. | 370/432 |

(Continued)

OTHER PUBLICATIONS

Active Software, Inc. "Active Software's Integration System", Jul. 24, 1998.

(Continued)

*Primary Examiner*—Min Jung
(74) *Attorney, Agent, or Firm*—Thelen LLP; David B. Ritchie

(57) ABSTRACT

Multiple simultaneous network connections from a single PPP connection may be accomplished by utilizing a gateway in the following manner. A first network connection is established between the gateway and a first network. A first real network address for the user is then received, the first real network address assigned by the first network. Then, the gateway may establish a network session between the gateway and a second network and receive a second real network address for the user, the second real network address assigned by the second network. A virtual network address may be assigned to the user for network address translation purposes. Additional network connections may be added in a similar manner. Network address translation is then performed on packets traveling between the user and any of the network sessions. This allows each of the simultaneous network connections to gain the benefits of network address translation.

35 Claims, 5 Drawing Sheets

U.S. PATENT DOCUMENTS

| | | | | |
|---|---|---|---|---|
| 5,684,950 | A | 11/1997 | Dare et al. | 395/187.01 |
| 5,699,521 | A | 12/1997 | Iizuka et al. | 395/200.15 |
| 5,737,526 | A | 4/1998 | Periasamy et al. | 395/200.06 |
| 5,740,171 | A | 4/1998 | Mazzola et al. | 370/392 |
| 5,740,176 | A | 4/1998 | Gupta et al. | 370/440 |
| 5,787,253 | A | 7/1998 | McCreery et al. | 395/200.61 |
| 5,793,763 | A | 8/1998 | Mayes et al. | 370/389 |
| 5,799,017 | A | 8/1998 | Gupta et al. | 370/419 |
| 5,802,047 | A | 9/1998 | Kinoshita | 370/359 |
| 5,802,316 | A | 9/1998 | Ito et al. | 395/200.79 |
| 5,805,595 | A | 9/1998 | Sharper et al. | 370/442 |
| 5,815,665 | A | 9/1998 | Teper et al. | 395/200.59 |
| 5,835,727 | A | 11/1998 | Wong et al. | 395/200.68 |
| 5,838,683 | A | 11/1998 | Corley et al. | 370/408 |
| 5,854,901 | A | 12/1998 | Cole et al. | 395/200.75 |
| 5,856,974 | A * | 1/1999 | Gervais et al. | 370/392 |
| 5,867,495 | A | 2/1999 | Elliott et al. | 370/352 |
| 5,883,893 | A | 3/1999 | Rumer et al. | 370/395 |
| 5,933,625 | A | 8/1999 | Sugiyama | 395/557 |
| 5,944,824 | A | 8/1999 | He | 713/201 |
| 5,959,990 | A | 9/1999 | Frantz et al. | 370/392 |
| 5,991,810 | A | 11/1999 | Shapiro et al. | 709/229 |
| 5,991,828 | A | 11/1999 | Horie et al. | 710/8 |
| 6,009,103 | A | 12/1999 | Woundy | 370/401 |
| 6,011,909 | A | 1/2000 | Newlin et al. | 395/200.57 |
| 6,011,910 | A | 1/2000 | Chau et al. | 395/200.59 |
| 6,018,770 | A | 1/2000 | Little et al. | 709/223 |
| 6,021,496 | A | 2/2000 | Dutcher et al. | 713/202 |
| 6,026,086 | A | 2/2000 | Lancelot et al. | 370/353 |
| 6,026,441 | A | 2/2000 | Ronen | 709/227 |
| 6,028,848 | A | 2/2000 | Bhatia et al. | 370/257 |
| 6,029,203 | A | 2/2000 | Bhatia et al. | 709/244 |
| 6,047,325 | A | 4/2000 | Jain et al. | 709/227 |
| 6,047,376 | A | 4/2000 | Hosoe | 713/201 |
| 6,055,236 | A | 4/2000 | Nessett et al. | 370/389 |
| 6,065,049 | A | 5/2000 | Beser et al. | 709/218 |
| 6,065,064 | A | 5/2000 | Satoh et al. | 709/249 |
| 6,091,951 | A | 7/2000 | Sturniolo et al. | 455/432 |
| 6,092,196 | A | 7/2000 | Reiche | 713/200 |
| 6,098,106 | A | 8/2000 | Philyaw et al. | 709/238 |
| 6,119,160 | A | 9/2000 | Zhang et al. | 709/224 |
| 6,141,687 | A | 10/2000 | Blair | 709/225 |
| 6,157,636 | A | 12/2000 | Voit et al. | 370/353 |
| 6,160,808 | A | 12/2000 | Maurya | 370/389 |
| 6,226,678 | B1 | 5/2001 | Mattaway et al. | 709/230 |
| 6,269,099 | B1 | 7/2001 | Borella et al. | 370/389 |
| 6,317,594 | B1 | 11/2001 | Gossman et al. | 455/414 |
| 6,381,646 | B2 * | 4/2002 | Zhang et al. | 709/227 |
| 6,490,289 | B1 * | 12/2002 | Zhang et al. | 370/401 |
| 6,674,758 | B2 * | 1/2004 | Watson | 370/401 |
| 6,721,329 | B1 * | 4/2004 | Van Driel | 370/401 |
| 6,822,955 | B1 * | 11/2004 | Brothers et al. | 370/389 |
| 6,822,957 | B1 * | 11/2004 | Schuster et al. | 370/389 |

OTHER PUBLICATIONS

Ascend Communications, Inc., Access Control Product Information, 1997, 4 pages.

Ascend Communications, Inc., "Remote Access Network Security", Jul. 24, 1998, pp. 1-8.

Droms, R., "Dynamic Host Configuration Protocol", Bucknell University, Network Working Group, Oct. 1993, pp. 1-35.

Mecklermedia Corporation, PC Webopaedia Definition and Links, "L2TP", Sep. 21, 1998.

Valencia, et al., "Layer Two Tunneling Protocol L2TP", PPP Working Group, May 1998, pp. 1-68.

Mecklermedia Corporation, NAT-PC Webopaedia Definition and Links, "NAT", Sep. 19, 1998.

"NAT and Networks", Sep. 19, 1998, pp. 1-12.

NAT Information, "Network Address Translation Information", Sep. 19, 1998, pp. 1-2.

Perkins, D., "Requirements for an Internet Standard Point-to-Point Protocol", Carnegie Mellon University, Network Working Group, Dec. 1993, pp. 1-19.

Simpson, W., "The Point-to-Point Protocol (PPP)", Daydreamer, Network Working Group, Dec. 1993, pp. 1-53.

D. Carrel et al., Network Working Group, Cisco Systems, "The TACACS+ Protocol Version 1.78", Jan. 1997, pp. 1-40.

Mecklermedia Corporation, PC Webopaedia Definition and Links, "Tunneling", Sep. 21, 1998.

* cited by examiner

US 7,443,865 B1

MULTIPLE NETWORK CONNECTIONS FROM A SINGLE PPP LINK WITH NETWORK ADDRESS TRANSLATION

STATEMENT OF RELATED APPLICATION

This application claims priority under U.S. patent application, Ser. No. 09/186,213, filed on Nov. 3, 1998, now U.S. Pat. No. 6,490,289 in the name of the same inventors and commonly owned herewith.

BACKGROUND OF THE INVENTION

1. Field of the Invention

The present invention relates to the field of computer networks. More particularly, the present invention relates to managing multiple network connections from a single PPP link while performing network address translation.

2. The Background

The Point-to-Point protocol (PPP) is a data link protocol that provides dial up access over analog or digital transmission lines. PPP provides many advanced features, including error detection, support of multiple protocols, negotiation of IP addresses at connection time, and authentication. There are three main features of PPP. The first is that it provides a framing method to delineate the end of one frame and the beginning of the next one, in order to handle error detection. The second is a link control protocol for bringing lines up, testing them, negotiating options, and bringing them down again when they are no longer needed. This is known as the Link Control Protocol (LCP). The third is a way to negotiate network layer options in a way independent of the network layer protocol to be used. Thus, the method chosen may have a different Network Control Protocol (NCP) for each network layer supported.

PPP is commonly used as the data link protocol between a user and an Internet Service Provider (ISP) or access point. This is usually accomplished through the following method. The personal computer of the user by is instructed to call the ISP through a modem. After the ISP's modem receives the call and establishes a physical connection, the personal computer sends a series of LCP packets in the payload field of one or more PPP frames. These packets, and their responses, comprise the negotiation of the session, and set the PPP parameters to be used during the session.

Once the negotiation is complete, a series of NCP packets are sent to configure the network layer. Typically, the personal computer wants to run a TCP/IP protocol stack, so it needs an IP address. The NCP for IP may then be used to assign an IP address to the user (dynamic assignment of IP addresses is now common for dial-up users). At this point, the personal computer has become an Internet host and may send and receive IP packets, just as a hardwired host could. When the user has finished, NCP is used to tear down the network layer connection and free the IP address. The LCP is then used to shut down the data link layer connection. Finally, the personal computer hangs up the modem, releasing the physical layer connection.

There are currently eleven types of LCP packets. These types are illustrated in Table 1 below, along with the direction in which they travel (from Initiator (I) to responder (R) or vice-versa) and their description.

In recent years, "intranets" have been rising in popularity, especially with large companies. An intranet is an internal network that serves only a specific type of person (such as employees of a corporation, or students at a school). The intranet is usually not accessible to the general public. Intranets have become popular mainly because they allow for much more productive communication between users within the network,

TABLE 1

| Name | Direction | Description |
| --- | --- | --- |
| Configure-request | I → R | List of proposed options and values |
| Configure-ack | I ← R | All options are accepted |
| Configure-nak | I ← R | Some options are not accepted |
| Configure-reject | I ← R | Some options are not negotiable |
| Terminate-request | I → R | Request to shut down the line |
| Terminate-ack | I ← R | OK to shut down the line |
| Code-reject | I ← R | Unknown request received |
| Protocol-reject | I ← R | Unknown protocol received |
| Echo-request | I → R | Please send this frame back |
| Echo-reply | I ← R | Here is the frame back |
| Discard-request | I → R | Discard this frame (for testing) | even when the users are dispersed over a wide geographic area (such as in multi-national corporations).

FIG. 1 is a block diagram depicting the typical connection to an intranet. Personal computer 10 connects through a link 12 to an Internet service provider (ISP) or access point (AP) 14. The ISP or AP 14 then connects through link 16 to the Intranet 18.

Many entities that maintain intranets, however, have also wanted to offer users access to the Internet or to other intranets as well. There were, however, a limited number of ways that this could be accomplished. The first, and most simple, way would be for the user to first terminate the existing PPP connection between the PC 10 and the ISP or access point 24. Then the user could log into a second intranet or to the Internet. The major drawbacks of this solution are obvious. It does not allow for simultaneous connection to two intranets, or to one intranet and the Internet, thus limiting the productivity of the user. Additionally, it requires termination of the PPP link between the PC and the ISP, thus using up valuable time on the user's end, as he has to re-initiate a connection process.

The second way an entity could offer access to a second intranet or to the Internet is to have a preconfigured connection from the intranet to the second intranet or Internet, such that communications between the user and the second intranet or Internet pass through the intranet. FIG. 2 is a block diagram illustrating a connection to the Internet 62 through an intranet 58. A user at PC 50 maintains a PPP connection 52 to ISP 54, which is connected to the intranet 58. Intranet 58 is then connected through link 60 to the Internet 62. The drawback of this solution is that the traffic from the user at PC 50 to the Internet 62 passes through the intranet 58. This increases the traffic traveling through the intranet 58 and poses a security risk to the information sent via the intranet 58.

One major drawback of PPP, therefore, is that it is designed as a point to point protocol, meaning that it is designed for use between two endpoints. Therefore, it is currently not possible for a user to connect to two independent endpoints simultaneously (such as an intranet and the Internet, or to two independent intranets) using a single PPP link.

What is needed is a method by which a user may connect to two independent endpoints simultaneously using a single PPP link.

SUMMARY OF THE INVENTION

Multiple simultaneous network connections from a single PPP connection may be accomplished by utilizing a gateway in the following manner. A first network connection is established between the gateway and a first network. A first real network address for the user is then received, the first real network address assigned by the first network. Then, the gateway may establish a network session between the gateway and a second network and receive a second real network address for the user, the second real network address assigned by the second network. A virtual network address may be assigned to the user for network address translation purposes. Additional network connections may be added in a similar manner. Network address translation is then performed on packets traveling between the user and any of the network sessions. This allows each of the simultaneous network connections to gain the benefits of network address translation.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In accordance with a presently preferred embodiment of the present invention, the components, process steps, and/or data structures are implemented using a gateway device. Different implementations may be used and may include other types of operating systems, computing platforms, computer programs, and/or general purpose machines. In addition, those of ordinary skill in the art will readily recognize that devices of a less general purpose nature, such as hardwired devices, devices relying on FPGA or ASIC technology, or the like, may also be used without departing from the scope and spirit of the inventive concepts disclosed hereinwith.

Figure 1:
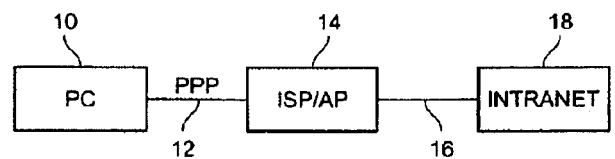
FIG. 1 is a block diagram depicting a typical connection to an intranet.
Figure 2:
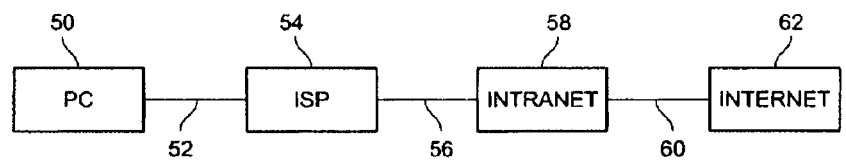
FIG. 2 is a block diagram illustrating a connection to the Internet through an intranet.
Figure 3:
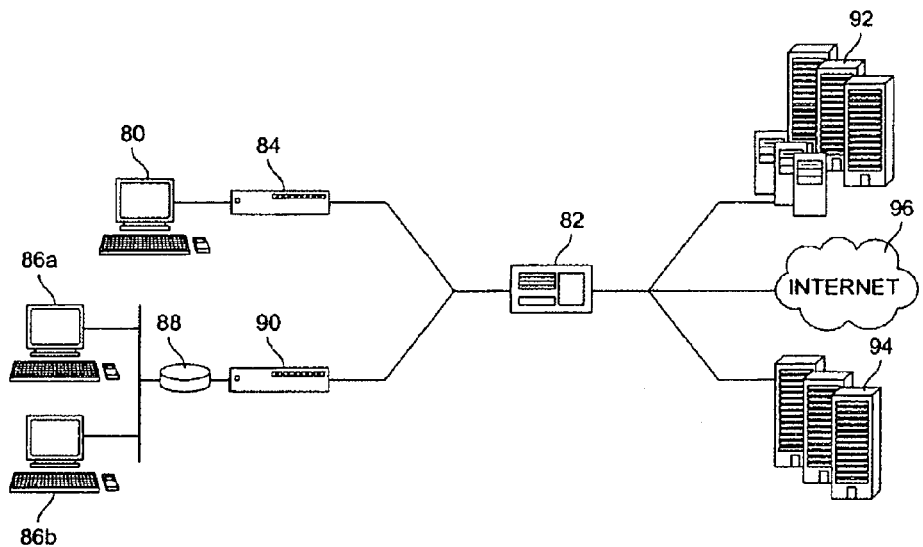
FIG. 3 is a diagram illustrating the use of a gateway to couple multiple networks in accordance with a presently preferred embodiment of the present invention.

A method for making multiple network connections with network address translation is provided. This method may be executed by a gateway. A gateway is a device which performs protocol conversion between different types of networks or applications. The term gateway is not meant to be limited to a single type of device, as any device, hardware or software, that may act as a bridge between the user and the networks may be considered a gateway for purposes of this application. FIG. 3 is a diagram illustrating the use of a gateway to couple multiple networks. Computer 80 connects to gateway 82 through a modem 84, while computers 86a and 86b couple to a hub 88, then through modem 90 to gateway 82. Gateway 82 may then interface computers 80, 86a, and 86b to multiple networks. These may include a first corporate intranet 92, a second corporate intranet 94, and the Internet 96.

In the present invention, network address translation (NAT) is utilized on all the network connections. NAT is an Internet standard that enables a local-area network (LAN), intranet, or ISP to use one set of network addresses for internal traffic and a separate set of network addresses for external traffic. Network addresses are generally Internet Protocol (IP) addresses, but there are many other possible network addresses as well. At the ISP level, there is normally a gateway, which is a device that acts as an interface between the ISP and the intranet or Internet. When network address translation is used, the Gateway will act to convert the destination addresses of incoming packets and source addresses of outgoing packets so that traffic is directed to the correct address.

Network address translation provides two main advantages. First, it adds security to the LAN or intranet, as it acts as a type of firewall, preventing users from outside the LAN or intranet from determining the internal network addressing scheme of the LAN or intranet. Second, it saves network addresses. With the ever growing popularity of the Internet and computer networks, a major issue is the availability of IP addresses. A standard IP address is 32 bytes in length, providing a total of $2^{32}$ possible IP addresses. Those of ordinary skill in the art will readily recognize that not all of these possible IP addresses are available due to administrative expediencies, such as reserving blocks of IP addresses for future use. Network address translation saves IP addresses by allowing the ISP to use IP addresses internally that may be used by other networks on the Internet because there is no possibility of conflict.

Figure 4:
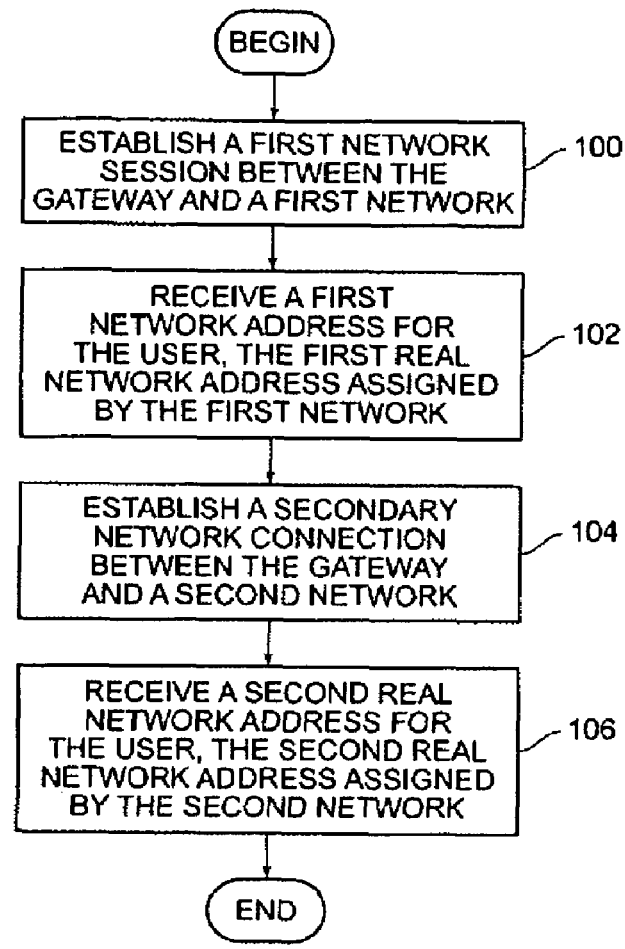
FIG. 4 is a flow diagram illustrating a method for establishing multiple network connections for a user having a PPP connection to a gateway according to presently preferred embodiment of the present invention.

FIG. 4 is a flow diagram illustrating a method for establishing multiple network connections for a user having a PPP connection to a gateway according to presently preferred embodiment of the invention. This method may be executed by a gateway. At step 100, a first network session is established between the user and the first network. The connection does not have to be PPP, but may be any other communications standard. At step 102, a first real network address is received for the user. This first real network address is assigned by the first network.

At some point during the session, the user may request connection to a second network. Therefore, at step 104, the gateway may establish a second network session between the gateway and a second network. At step 106, a second real network address for the user is received, the second real network address assigned by the second network. this may or may not require an action to be taken by the gateway when the connection is established. Some forms of network address translation require that a NAT table be maintained. In such instances, the gateway may assign the user a virtual network address according to a network address translation allocation scheme and store the virtual network address in a NAT table in an entry corresponding to the real network address received from the network being connected. Some forms of network address translation involve simply applying the network address translation scheme to each packet as it is received. In such instances, not steps need to be taken by the gateway until a packet is received.

Figure 5:
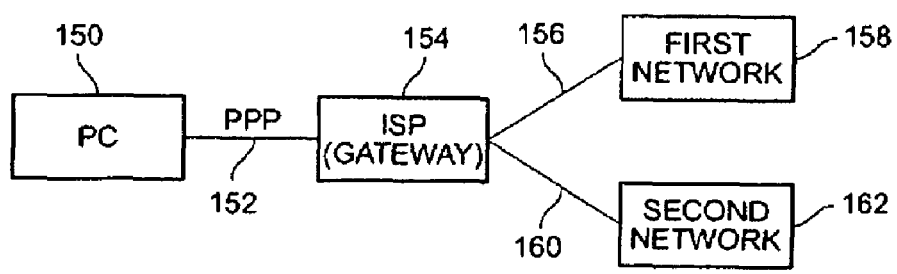
FIG. 5 is a block diagram illustrating multiple network connections from a single PPP connection as they would appear after the steps depicted in FIG. 4 were executed in accordance with a presently preferred embodiment of the present invention.

FIG. 5 is a block diagram illustrating multiple network connections from a single PPP connection as they would appear after the steps depicted in FIG. 4 were executed. PC 150 maintains the PPP connection to the ISP 154, which may contain the gateway. First network session 156 links the gateway to the first network 158, while second network connection 160 connects the gateway to the second network.

The gateway may configure more than two network sessions should the user so desire. These additional network sessions are created in a similar fashion to the other network sessions.

Additionally, "tunneling" may be utilized in the case where not all the links follow the same protocol, but the two endpoints follow the same protocol. Tunneling allows two hosts on the same type of network to communicate even though there may be different types of network in between. Tunneling is accomplished by encapsulating packets sent from a first type of network within packets of a type compatible with a second type of network for the duration of the packet's journey through the second type of network. Then, the outer packet is stripped off (and possibly some demultiplexing takes place) when the packet reaches the first type of network again. Layer Two Tunneling Protocol (L2TP) is a specific tunneling protocol that acts as an extension of the PPP protocol to allow ISPs to operate virtual private networks. L2TP or any other tunneling protocol may be used when establishing the network sessions.

Figure 6:
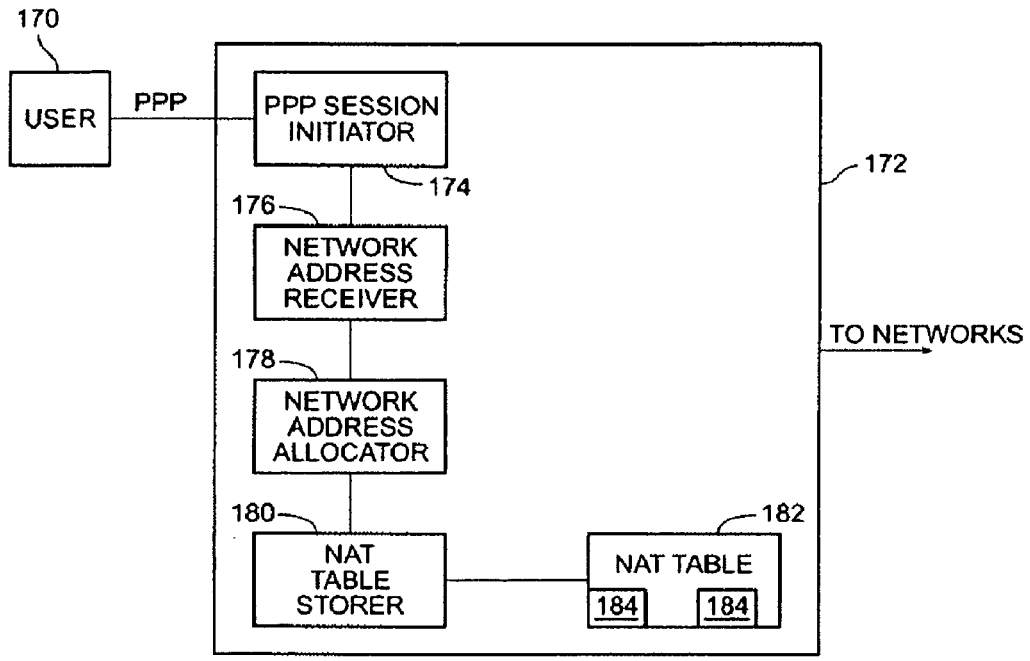
FIG. 6 is a block diagram illustrating a network gateway for use in a system having a user with a PPP connection to a gateway in accordance with a presently preferred embodiment of the present invention.

FIG. 6 is a block diagram illustrating a network gateway for use in a system having a user with a PPP connection to the gateway. User 170 has a PPP connection to gateway 172. The gateway 172 then contains many parts that interface the user 170 to multiple networks. A PPP session initiator 174 establishes a first PPP session between the gateway and a first network. A network address receiver 176 receives a first real network address for the user, the first real network address assigned by the first network. The PPP session initiator 174 further establishes a second PPP session between the gateway and a second network. The network address receiver further receives a second real network address for the use, the second real network address assigned by the second network.

A network address allocator 178 assigns the user a virtual network address. A NAT table storer 180 stores the virtual network address is a NAT table 182 in an entry 184 corresponding to the first real network address, and stores said virtual network address in the NAT table 180 in an entry 184 corresponding to the second real network address.

Figure 7:
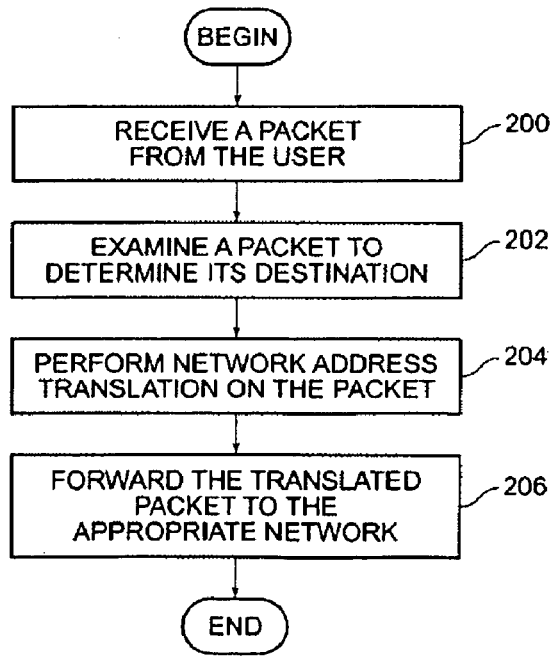
FIG. 7 is a flow diagram illustrating a method for outgoing communications routing in a system in which a user is connected to a first network and a second network according to a presently preferred embodiment of the present invention.

FIG. 7 is a flow diagram illustrating a method for outgoing communications routing in a system in which a user is connected to a first network and a second network according to a presently preferred embodiment of the invention.

Figure 8:
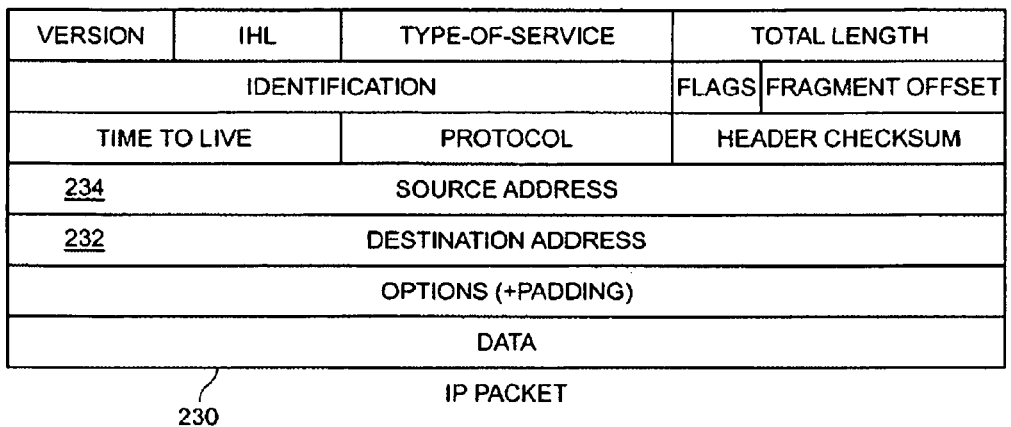
FIG. 8 is a diagram illustrating a packet in accordance with the IP protocol.

At step 200, a packet is received from the user. At step 202, the packet is examined to determine if its destination is the first network or the second network. FIG. 8 is a diagram illustrating a packet in accordance with the IP protocol. Normally, there will be a destination network address field 232 within the packet 230. The destination network address may then be extracted from this field. Then the address may be compared with a routing table. This routing table may be maintained by the gateway or a router. The routing table contains a list of addresses and the corresponding networks to which packets sent to that address should be routed. This allows the gateway to forward the packets to the correct network. In many cases, routing the packets to either network will allow the packet to arrive at its destination. In these cases, the routing table may indicate the network that will provide for the shortest travel time for the packet, in order to save the user some time. In yet other cases, it will not be clear to which network to send the packet (indicated by the fact that there is no entry for the address in the routing table). In these eases, a default network will be established to which to send packets.

Referring back to FIG. 7, at step 204, network address translation is performed (perhaps by applying a network address translation mapping scheme to the packet or perhaps by looking up the destination real address in a NAT table) to arrive at a real destination address. At step 206, the packet is then forwarded to the appropriate network. A similar scheme may be utilized when there are more than two simultaneous network connections, with NAT being performed on each network connection.

Figure 9:
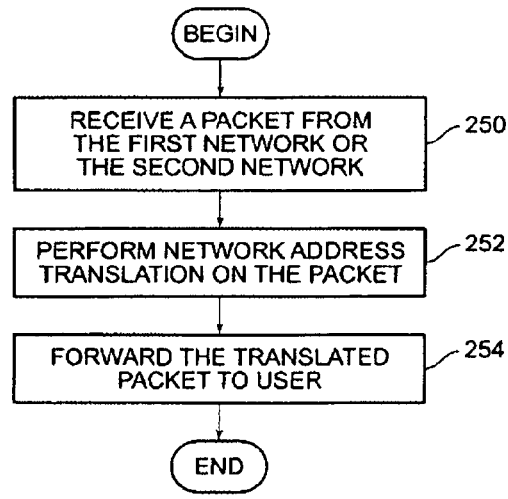
FIG. 9 is a flow diagram illustrating a method for incoming communications routing of in a system in which a user is connected to a first network and a second network according to a presently preferred embodiment of the present invention.

Likewise, when a packet is received from a network, then network address translation is performed. FIG. 9 is a flow diagram illustrating a method for incoming communications routing of in a system in which a user is connected to a first network and a second network. At step 250, a packet is received from the first network or the second network. At step 252, network address translation is performed on the packet. Then the packet is forwarded to the user at step 254.

Figure 10:
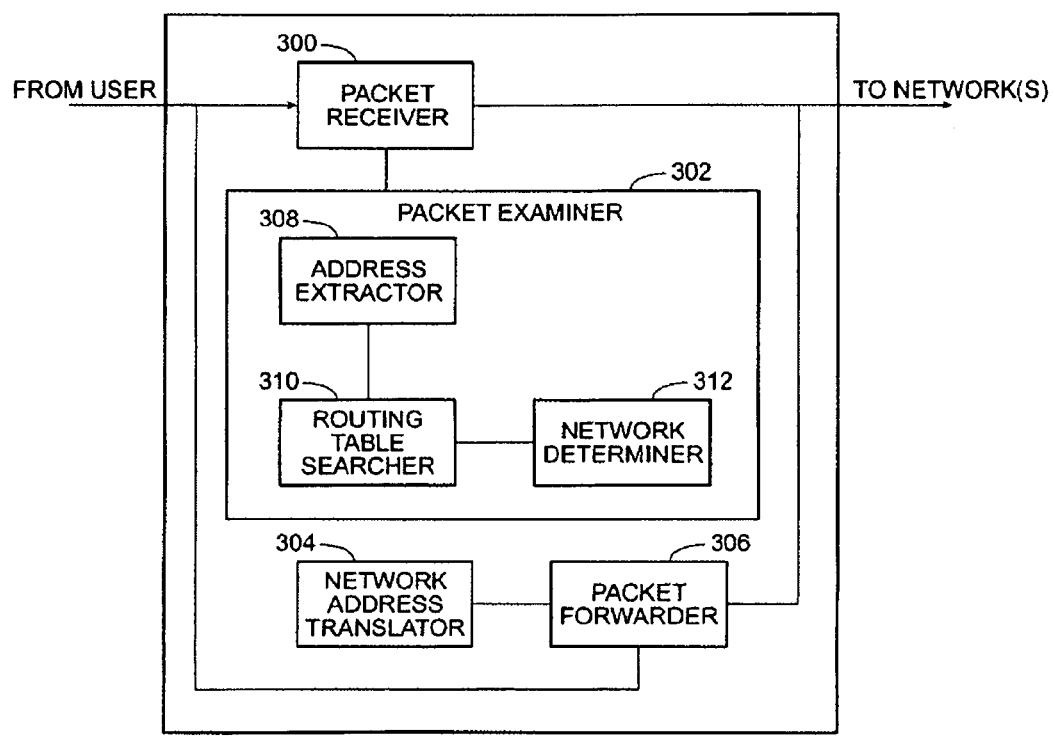
FIG. 10 is a block diagram illustrating a network gateway according to another embodiment of the present invention.

FIG. 10 is a block diagram illustrating a network gateway according to another embodiment of the present invention. The components of this gateway may be combined with the gateway depicted in FIG. 5 for use as one complete gateway. A packet receiver 300 receives a packet sent by the user. A packet examiner 302 examines the packet to determine if its destination is the first network or the second network. A network address translator 304 performs network address translation on the packet. A packet forwarder 306 forwards the translated packet to the first network or the second network, depending upon the packet's destination.

The packet examiner 302 may contain a network address extractor 308, which extracts a destination network address from the packet, a routing table searcher 310, which looks up the destination network address in a routing table, and a network determiner 312, which determines that the destination is the first network or the second network based upon the listing for the destination network address in the routing table. The network determiner 312 may further determine that the destination is the first network or second network based upon a default setting if the destination network address is not listed in the routing table.

The packet receiver 300 may further receive a second packet, the second packet sent from said first network or said second network. The network address translator 304 may further perform network address translation on said second packet. The packet forwarder 306 may further forward said second packet to the user.

This invention allows for the simultaneous connection to two or more network s from only one single PPP connection. It also allows for networks to be added at the time the user requests connection, such that the networks do not need to be preconfigured. All of the benefits of networks address translation may be realized on each of the simultaneous network connections. Additionally, an increase in security is provided in that traffic to networks travel directly to the gateway rather than through one of the other simultaneously connected networks.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for communications routing in a system in which a user is simultaneously connected to a first network and a second network, the method comprising:
    receiving a packet sent from the user;
    examining the packet to determine if its destination is the first network or the second network, the examining further comprising:
        extracting a destination network address from the packet;
        looking up the destination network address in a routing table;
        determining that the destination is the first or second network based upon the listing for the destination network address in the routing table; and
        determining that the destination is the first or second network based on a default setting if the destination network address is not listed in the routing table;
    performing network address translation on the packet generating a translated packet; and
    forwarding the translated packet to the first network or the second network, depending upon the packet's destination.

2. A method for communications routing in a system in which a user is simultaneously connected to a first network and a second network, the method comprising:
    receiving a packet sent from the user;
    examining the packet to determine if its destination is the first network or the second network;
    performing network address translation on the packet generating a translated packet, the performing network address translation comprising applying a network address translation mapping scheme to source network address; and
    forwarding the translated packet to the first network or the second network, depending upon the packet's destination.

3. The method of claim 2, further including:
    receiving a second packet, the second packet sent from the first network or the second network;
    performing network address translation on the second packet generating a second translated packet; and
    forwarding the second translated packet to the user.

4. A method for communications routing in a system in which a user is simultaneously connected to a first network and a second network, the method comprising:
    receiving a packet sent from the user;
    examining the packet to determine if its destination is the first network or the second network;
    performing network address translation on the packet generating a translated packet, the performing network address translation comprising looking up a source network address in a network address translation table; and
    forwarding the translated packet to the first network or the second network, depending upon the packet's destination.

5. A network gateway comprising:
    a packet receiver adapted to receive a packet sent by a user simultaneously connected to a first network and a second network;
    a packet examiner adapted to examine the packet to determine if its destination is the first network or the second network, the packet examiner further comprising:
        a network address extractor adapted to extract a destination network address from the packet;
        a routing table searcher adapted to look up the destination network address in a routing table;
        a network determiner adapted to determine that the destination is the first network or the second network based upon the listing for the destination network address in the routing table; and
        the network determiner adapted to further determine that the destination is the first network or the second network based on a default setting if the destination network address is not listed in the routing table;
    a network address translator adapted to perform network address translation on the packet generating a translated packet; and
    a packet forwarder adapted to forward the translated packet to the first network or the second network, depending upon the packet's destination.

6. A network gateway comprising:
    a packet receiver adapted to receive a packet sent by the user simultaneously connected to a first network and a second network;
    a packet examiner adapted to examine the packet to determine if its destination is the first network or the second network;
    a network address translator adapted to perform network address translation on the packet generating a translated packet, the network address translator further adapted to apply a network address translation mapping scheme to a source network address; and
    a packet forwarder adapted to forward the translated packet to the first network or the second network, depending upon the packet's destination.

7. The network gateway of claim 6, wherein the packet receiver is further adapted to receive a second packet, the second packet sent from the first network or the second network, the network address translator further adapted to perform network address translation on the second packet generating a second translated packet, and the packet forwarder is further adapted to forward the second translated packet to the user.

8. A network gateway comprising:
    a packet receiver adapted to receive a packet sent by a user simultaneously connected to a first network and a second network;
    a packet examiner adapted to examine the packet to determine if its destination is the first network or the second network;
    a network address translator adapted to perform network address translation on the packet generating a translated packet, the network address translator further adapted to look up a source network address in a network address translation table; and
    a packet forwarder adapted to forward the translated packet to the first network or the second network, depending upon the packet's destination.

9. A program storage device readable by a machine, tangibly embodying a program of instructions executable by the machine to perform a method for communications routing in a system in which a user is simultaneously connected to a first network and a second network, the method comprising:
    receiving a packet sent from the user;
    examining the packet to determine if its destination is the first network or the second network, the examining further comprising:
        extracting a destination network address from the packet;

looking up the destination network address in a routing table;

determining that the destination is the first or second network based upon the listing for the destination network address in the routing table; and determining that the destination is the first or second network based on a default setting if the destination network address is not listed in the routing table;

performing network address translation on the packet generating a translated packet; and forwarding the translated packet to the first network or the second network, depending upon the packet's destination.

10. A program storage device readably by a machine, tangibly embodying a program of instructions executable by the machine to perform a method for communications routing in a system in which a user is simultaneously connected to a first network and a second network, the method comprising:

receiving a packet sent from the user;

examining the packet to determine if its destination is the first network or the second network;

performing network address translation on the packet generating a translated packet, the performing network address translation comprising applying a network address translation mapping scheme to a source network address; and forwarding the translated packet to the first network or the second network, depending upon the packet's destination.

11. The program storage device of claim 10, wherein the method further includes:

receiving a second packet, the second packet sent from the first network or the second network;

performing network address translation on the second packet generating a second translated packet; and forwarding the second translated packet to the user.

12. A program storage device readable by a machine, tangibly embodying a program of instructions executable by the machine to perform a method for communications routing in a system in which a user is simultaneously connected to a first network and a second network, the method comprising:

receiving a packet sent from the user;

examining the packet to determine if its destination is the first network or the second network;

performing network address translation on the packet generating a translated packet, the performing network address translation comprising looking up a source network address in a network address translation table; and forwarding the translated packet to the first network or the second network, depending upon the packet's destination.

13. A method for communications routing in a system in which a user is connected to a first network and a second network, the method comprising:

receiving a packet sent from the first network or the second network, the packet having a destination address matching a virtual network address for the user stored in a network address translation table;

retrieving a real network address corresponding to the user and to the network from which the packet is received; and forwarding the packet to the real network address.

14. The method of claim 13, wherein the network address translation table contains an entry corresponding to the virtual network address and the first network, the entry having a first real network address.

15. The method of claim 14 wherein the network address translation table further contains an entry corresponding to the virtual network address and the second network, the entry having a second real network address.

16. The method of claim 13, wherein the virtual network address was assigned using a network address translation allocation scheme.

17. The method of claim 13, wherein the user is connected by the first network through a first tunneling session and the user is connected to the second network through a second tunneling session.

18. The method of claim 17, wherein the first tunneling session and the second tunneling session are L2TP sessions.

19. A network gateway, comprising:

a packet receiver adapted to receive a packet sent from a first network or a second network, the packet having a destination address matching a virtual network address for a user stored in a network address translation table;

a network address translator adapted to retrieve a real network address corresponding to the user and to the network from which the packet is received; and a packet forwarder adapted to forward the packet to the real network address.

20. The network gateway of claim 19, wherein the network address translation table contains an entry corresponding to the virtual network address and the first network, the entry having a first real network address.

21. The network gateway of claim 20, wherein the network address translation table further contains an entry corresponding to the virtual network address and the second network, the entry having a second real network address.

22. The network gateway of claim 19, wherein the virtual network address was assigned using a network address translation allocation scheme.

23. The network gateway of claim 19, wherein the user is connected to the first network through a first tunneling session and the user is connected to the second network through a second tunneling session.

24. The network gateway of claim 23, wherein the first tunneling session and the second tunneling session are L2TP sessions.

25. An apparatus for communications routing in a system in which a user is connected to a first network and a second network, the apparatus comprising:

means for receiving a packet sent from the first network or the second network, the packet having a destination address matching a virtual network address for the user stored in a network address translation table;

means for retrieving a real network address corresponding to the user and to the network from which the packet is received; and means for forwarding the packet to the real network address.

26. The apparatus of claim 25, wherein the network address translation table contains an entry corresponding to the virtual network address and the first network, the entry having a first real network address.

27. The apparatus of claim 26, wherein the network address translation table further contains an entry corresponding to the virtual network address and the second network, the entry having a second real network address.

28. The apparatus of claim 25, wherein the virtual network address was assigned using a network address translation allocation scheme.

29. The apparatus of claim 25, wherein the user is connected to the first network through a first tunneling session and the user is connected to the second network through a second tunneling session.

30. The apparatus of claim 29, wherein the first tunneling session and the second tunneling session are L2TP sessions.

31. A program storage device readable by a machine, tangibly embodying a program of instructions executable by the machine to perform a method for communications routing in a system in which a user is connected to a first network and a second network, the method comprising:
   receiving a packet sent from the first network or the second network, the packet having a destination address matching a virtual network address for the user stored in a network address translation table;
   retrieving a real network address corresponding to the user and to the network from which the packet is received; and
   forwarding the packet to the real network address.

32. An apparatus for communications routing in a system in which a user is simultaneously connected to a first network and a second network, the apparatus comprising:
   means for receiving a packet sent from the user;
   means for examining the packet to determine if its destination is the first network or the second network, the means for examining further comprising:
      means for extracting a destination network address from the packet;
      means for looking up the destination network address in a routing table;
      means for determining that the destination is the first or second network based upon the listing for the destination network address in the routing table; and
      means for determining that the destination is the first or second network based on a default setting if the destination network address is not listed in the routing table;
   means for performing network address translation on the packet generating a translated packet; and
   means for forwarding the translated packet to the first network or the second network, depending upon the packet's destination.

33. An apparatus for communications routing in a system in which a user is simultaneously connected to a first network and a second network, the apparatus comprising:
   means for receiving a packet sent from the user;
   means for examining the packet to determine if its destination is the first network or the second network;
   means for performing network address translation on the packet generating a translated packet, the means for performing network address translation further comprising means for applying a network address translation mapping scheme to a said source network address; and
   means for forwarding the translated packet to the first network or the second network, depending upon the packet's destination.

34. The apparatus of claim 33, further comprising:
   means for receiving a second packet, the second packet sent from the first network or the second network;
   means for performing network address translation on the second packet generating a second translated packet; and
   means for forwarding the second translated packet to the user.

35. An apparatus for communications routing in a system in which a user is simultaneously connected to a first network and a second network, the apparatus comprising:
   means for receiving a packet sent from the user;
   means for examining the packet to determine if its destination is the first network or the second network;
   means for performing network address translation on the packet generating a translated packet, the means for performing network address translation further comprising means for looking up a source network address in a network address translation table; and
   means for forwarding the translated packet to the first network or the second network, depending upon the packet's destination.

* * * * *